United States Patent [19]
Roman

[11] Patent Number: 5,707,030
[45] Date of Patent: Jan. 13, 1998

[54] WASTE-CARRIER TROLLEY WITH A BASE IN THE FORM OF A TRAY, MORE PARTICULARLY FOR GARDENING

[75] Inventor: Gianfranco Roman, Pasiano, Italy

[73] Assignee: Claber S.p.A., Fiume Veneto, Italy

[21] Appl. No.: 731,051

[22] Filed: Oct. 9, 1996

[30] Foreign Application Priority Data

Oct. 13, 1995 [IT] Italy ................. MI950699 U

[51] Int. Cl.$^6$ ................................. B62B 1/12
[52] U.S. Cl. .................... 248/98; 280/47.19; 280/654
[58] Field of Search ............... 248/98, 129; 280/47.19, 280/654, 655

[56] References Cited

U.S. PATENT DOCUMENTS 4,452,468 6/1984 Eads ............................. 248/98

FOREIGN PATENT DOCUMENTS 0 626 300 A1  11/1994  European Pat. Off. .
92/14638       9/1992  WIPO .

*Primary Examiner*—Alvin C. Chin-Shue
*Attorney, Agent, or Firm*—Nixon & Vanderhye, P.C.

[57] ABSTRACT

The trolley comprises a pair of sides in a plastic material provided with a through hole for inserting and separably snap-locking a support shaft for a pair of wheels and upper housings for inserting and separably snap-locking respective ends of a tubular metal element, bent into a U shape, which forms a handle for manoeuvring the trolley. The tubular element is mechanically restrained at a variable height to an attachment ring for a collection bag. The trolley also comprises a tray in a plastic material designed to act as a base for supporting the trolley on the ground and as an element for supporting the base of the bag. The tray is fitted with projections which can be inserted and separably snap-locked in lower housings of the sides of the trolley and means for its separable snap-hooking to the shape for supporting the wheels.

7 Claims, 4 Drawing Sheets

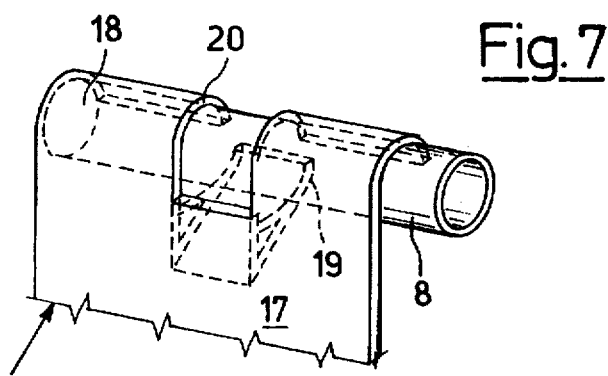
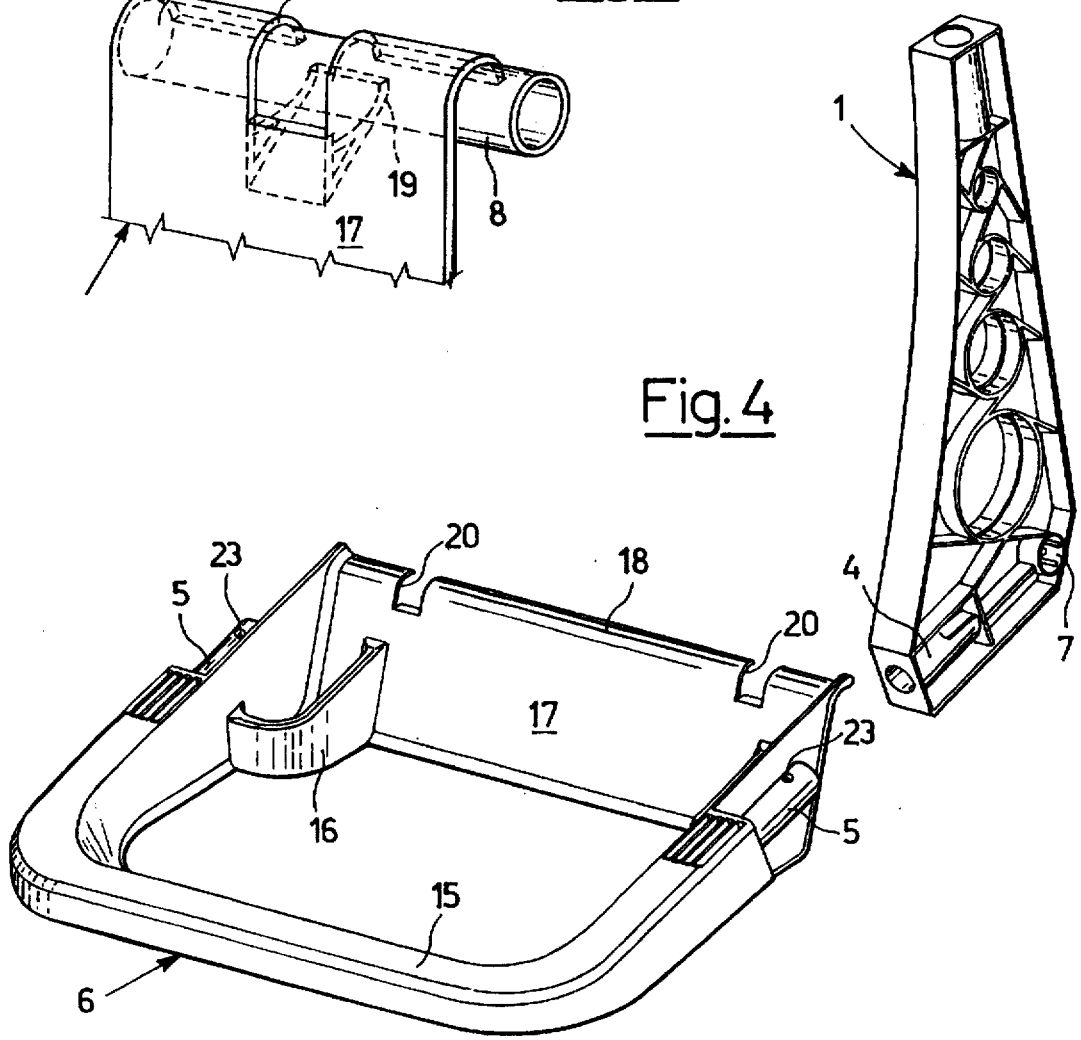
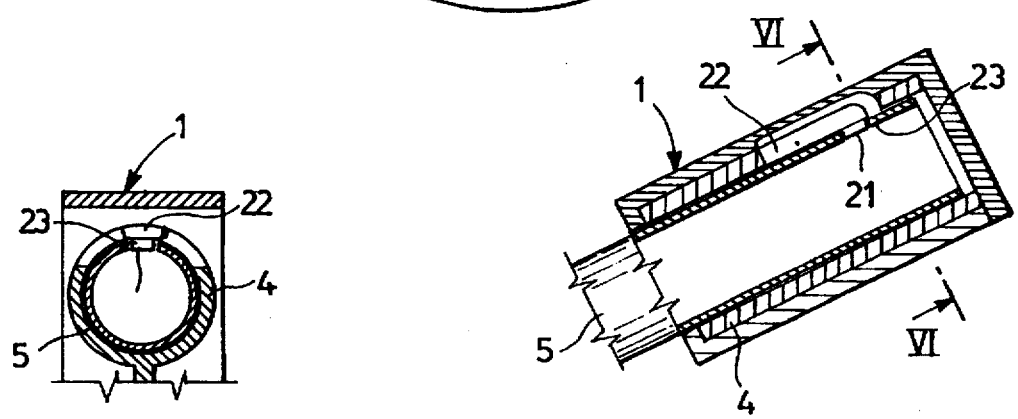

WASTE-CARRIER TROLLEY WITH A BASE IN THE FORM OF A TRAY, MORE PARTICULARLY FOR GARDENING

The present invention relates to a waste-carrier trolley with the base in the form of a tray, more particularly for gardening.

In the European Patent Application no. 0626300, in the name of the same Applicant, a description is given of a trolley for the collection of waste, more particularly that produced during work in the garden, which comprises a pair of sides in a plastic material provided with a through hole for the insertion and the separable snap-locking of a shaft for supporting a pair of wheels and housings for inserting and separably snap-locking respective ends of tubular metal elements bent into a U shape, upper and lower, which form a manoeuvring handle and a base for resting the trolley on the ground respectively. A ring is also provided for the attachment of a collection bag, which is mechanically coupled to said upper tubular element at a height which varies in relation to the lower tubular element, which in turn supports a metal basket for supporting the base of the bag. A rotating lid can finally be connected to the aforementioned attachment ring to cover the bag when required.

The object of the present invention is that of improving the aforementioned trolley, making resting of the trolley on the ground and support of the base of the bag simpler, less expensive and more functional.

In accordance with the invention this object is achieved with a trolley which is distinguished from that of the aforementioned European Patent Application due to the fact that the lower tubular metal element with related basket for supporting the bag is replaced by a tray in a plastic material fitted with projections which can be inserted and separably snap-locked in said housings of the sides of the trolley and means for separably snap-locking to the shaft supporting the wheels.

The use of a tray in a plastic material with the dual function of a support base of the trolley and support of the bag eliminates the costly use of a lower tubular metal element bent into a U shape and a basket, also in metal, complicated to machine, and hence definitively reduces the cost of the trolley, and on the other hand ensures a better support of the base of the bag and the collection of any liquids and other materials discharged from the bag. It is easy to wash and, if necessary, can be detached and re-attached as required.

These and other features of the present invention will be made clearer from the following detailed description of one of its embodiments, illustrated by way of a non-limiting example in the accompanying drawings, in which:

FIG. 4 shows the base tray and one of the two sides of said trolley in an exploded perspective;

FIG. 5 shows a sectioned and enlarged detail of the attachment of the tray to one of said sides;

FIG. 6 shows the same detail sectioned along line VI—VI of FIG. 5;

FIG. 7 shows in perspective the enlarged detail of the hooking of the tray to the shaft for supporting the wheels.

Figure 1:
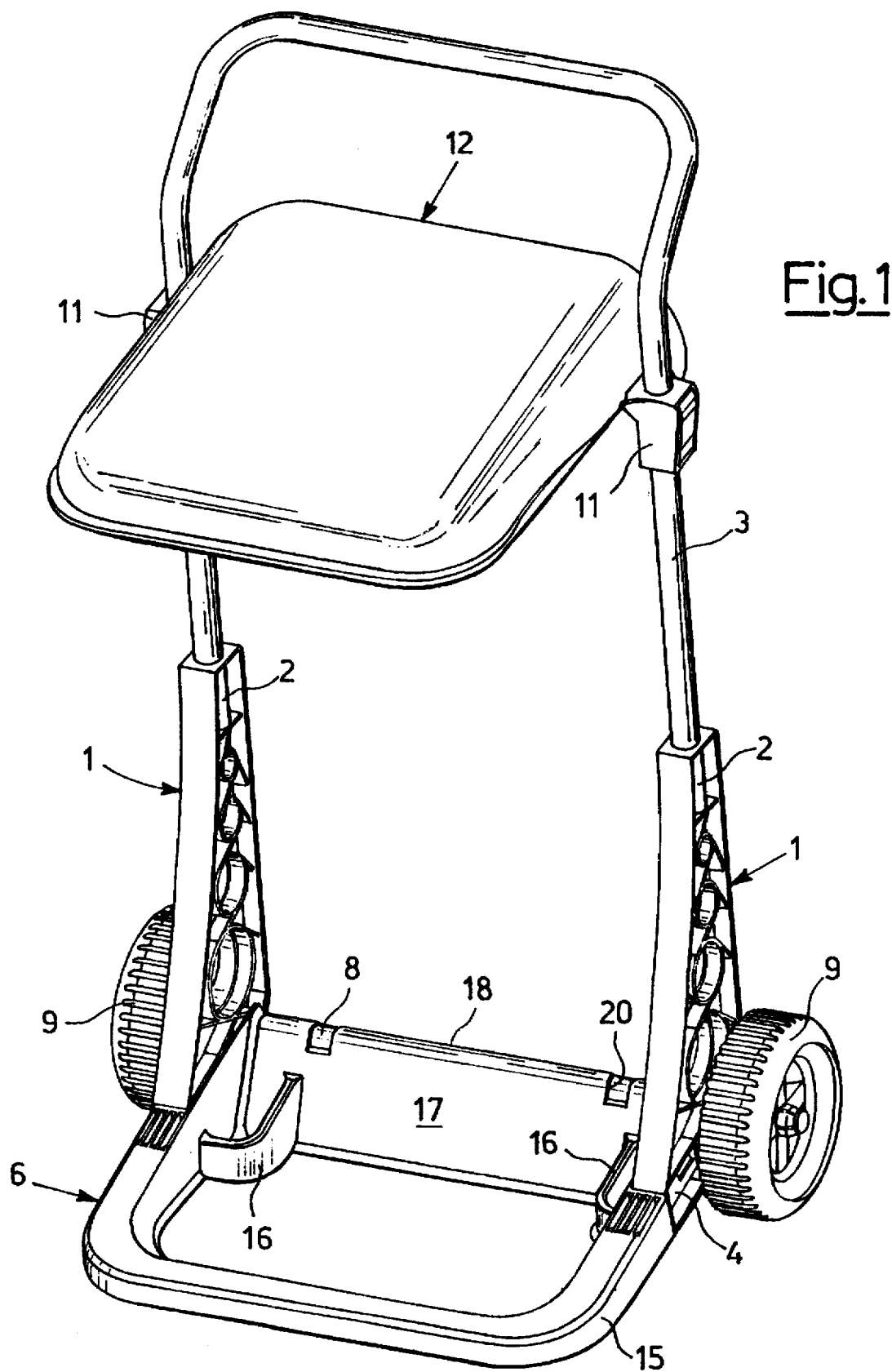
FIG. 1 shows in perspective a trolley according to the invention with the lid in the closure position.
Figure 2:
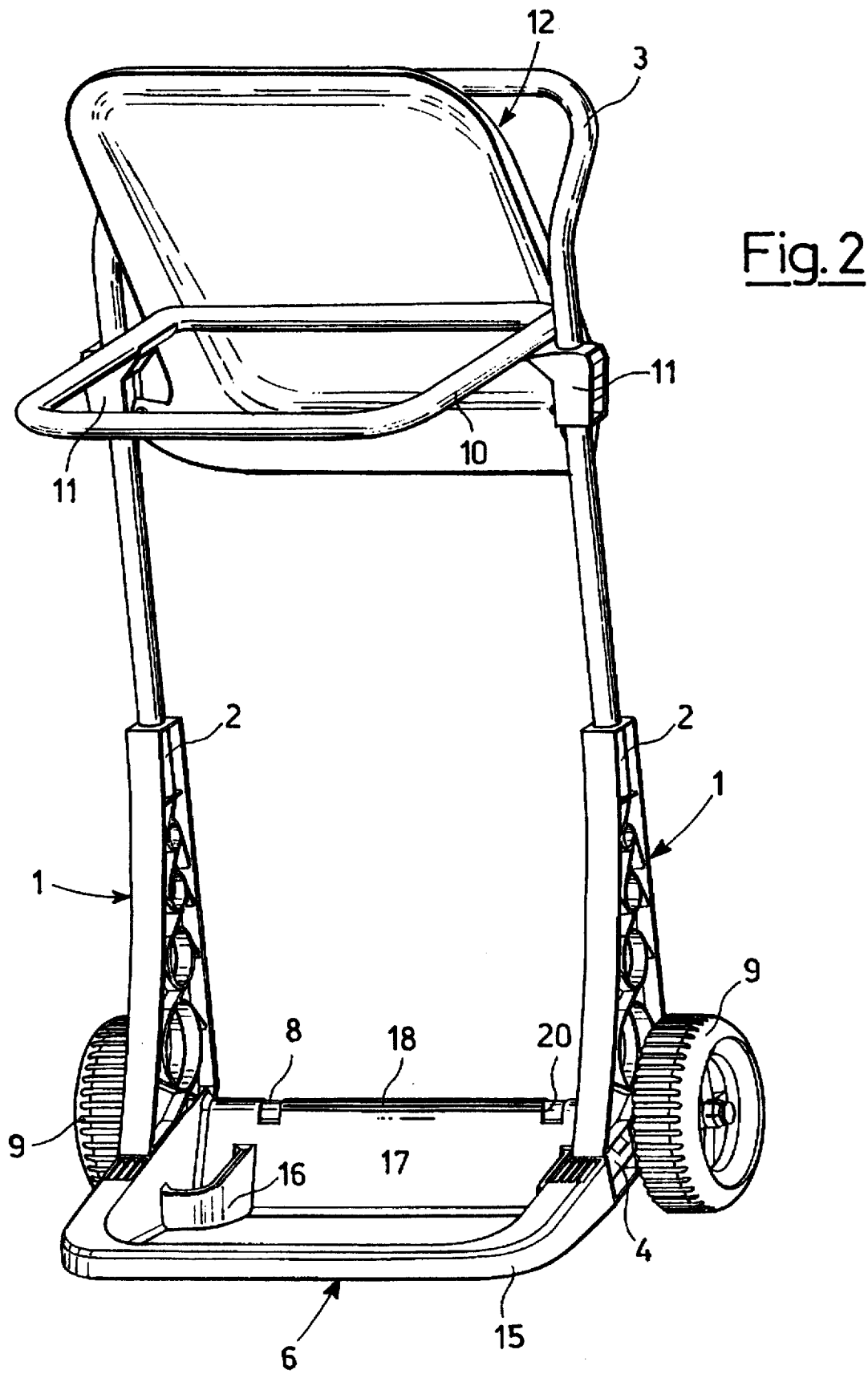
FIG. 2 shows said trolley again in perspective but with the lid open.

With reference to FIGS. 1 and 2, a waste-carrier trolley according to the invention comprises a pair of lateral sides 1, made in a plastic material, each provided with an upper housing 2 wherein a respective end of a tubular metal element 2, U-shaped and partially bent backwards to form a handle for manoeuvring the trolley, is inserted and separably snap-locked.

Each side 1 is also provided with a lower housing 4, wherein a respective rear tubular projection 5 (FIG. 4) of a tray in a plastic material 6 which acts as a base for supporting the trolley, is inserted and separably snap-locked.

Each side 1 is also provided with a through hole 7 (FIG. 4) wherein a metal shaft 8, used to support rotatingly a pair of wheels 9, is inserted and separably snap-locked.

A ring 10, suitable for the separable attachment of the top of a collection bag (not shown in the drawings), is coupled to the tubular metal element 3 by means of a pair of sleeves 11, which may be made to slide along two vertical sections of the tubular element itself in order to vary the height of the top of the bag from the ground. Each of said sleeves is fitted with suitable means for their locking at the chosen height, for example of the lever type described in the European Patent Application referred above.

Figure 3:
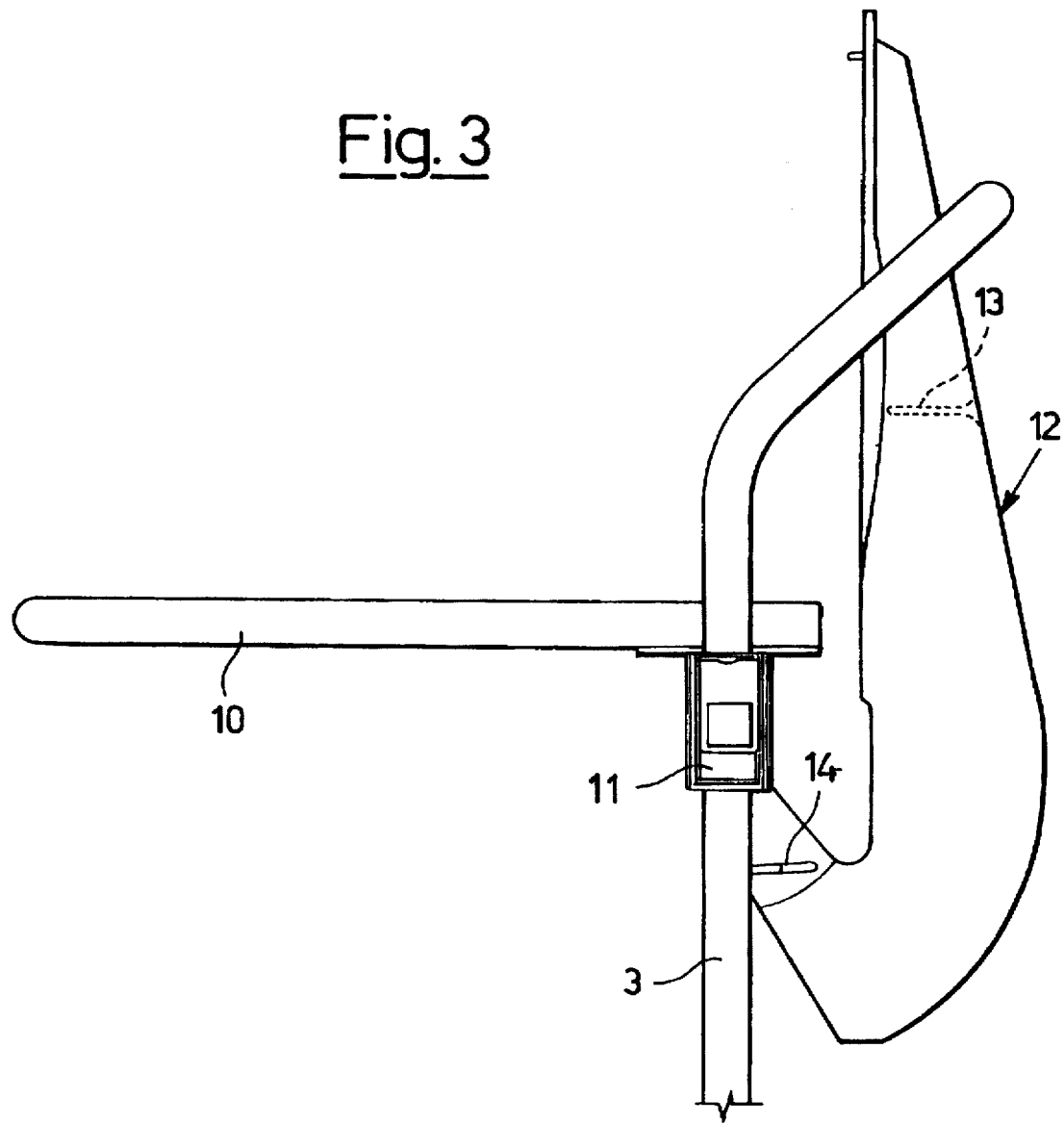
FIG. 3 shows the upper part of the trolley with the lid open in an enlarged lateral view.

Each of the sleeves 11 is also provided, on the inner wall, with a pin (not shown in the drawings but also of the type described in the aforementioned European Patent Application), whereon a tiltable lid 12 is separably engaged. In the closure position of FIG. 1 the lid 12 rests horizontally on the ring 10 for the upper covering of the bag, using for this purpose a pair of internal ribs 13 shown in FIG. 3, while in the opening position of FIG. 2 the lid 12 is arranged and remains in a vertical position, using for this purpose an appropriate arrangement of the centre of gravity and a pair of ribs 14, also shown in FIG. 3, which butt against the aforementioned vertical sections of the tubular element 3.

The base of the bag attached to the ring 10 is supported by the aforementioned tray 6, whose constructional details, including its means of hooking to the sides and to the shaft of the wheels, can be seen in FIGS. 4–7.

The tray 6 consists of a hollow body with a continuous base and raised front and side edge 15, internal reinforcement ribs 16 and rear wall 17 hooked separably to the shaft 8 of the wheels 9 thanks to an upper turned-up part 18 and to lower turned-up brackets 19 provided at the small windows 20 formed on the top of the rear wall 17 (FIGS. 1, 2, 4 and 7).

The tray 6 is attached to the sides 1, as mentioned previously, by the insertion and snap-locking of the tubular projections 5, which extend at the rear from the lateral parts of the edge 15 of the tray, in the lower housings 4 of the sides. As shown in FIGS. 5 and 6, the snap-locking is obtained by inserting a tooth 21 projecting transversely from an elastic tab 22 integral with the housing 4 into a radial hole 23 of the tubular projection 5.

I claim:

1. Waste-carrier trolley, more particularly for gardening, comprising a pair of sides in a plastic material provided with a through hole for the insertion and separable snap-locking of a shaft for supporting a pair of wheels and upper housings for the insertion and separable snap-locking of respective ends of a tubular metal element bent into a U shape, which forms a handle for manoeuvring the trolley and whereto a ring for the attachment of a collection bag is coupled mechanically at a variable height, characterised in that it also comprises a tray in a plastic material designed to act as a base for supporting the trolley on the ground and as an element for supporting the base of the bag, said tray being provided with projections which can be inserted and separably snap-locked in lower housings of the sides of the trolley and means for its separable snap-hooking to the shaft for supporting the wheels.

2. Trolley according to claim 1, characterised in that said tray consists of a hollow body with a continuous base and raised front and side edge and rear wall.

3. Trolley according to claim 1, characterised in that said lower housings of the sides are each provided with a flexible tab provided with a transverse tooth which can be inserted in a radial hole of a respective tubular projection of the tray for the snap-locking of the tubular projection in the respective housing.

4. Trolley according to claim 2, characterised in that said means for the separable snap-hooking of the tray to the shaft supporting the wheels consist of an upper turned-up part of said rear wall and of underlying lower brackets turned upwards.

5. Trolley according to claim 1, characterised in that it comprises a rotating lid connected to said attachment ring to cover the bag when required.

6. Trolley according to claim 5, characterised in that said lid is provided with internal ribs for its resting on said attachment ring when it is arranged in a position of closure of the bag.

7. Trolley according to claim 5, characterised in that said lid is provided with further ribs which can butt against vertical sections of said tubular element to maintain said lid in a position of opening of the bag.

* * * * *